P. G. GIDDENS.
DRIVING REIN SUPPORT.
APPLICATION FILED OCT. 26, 1916. RENEWED JAN. 8, 1918.
1,309,195. Patented July 8, 1919.
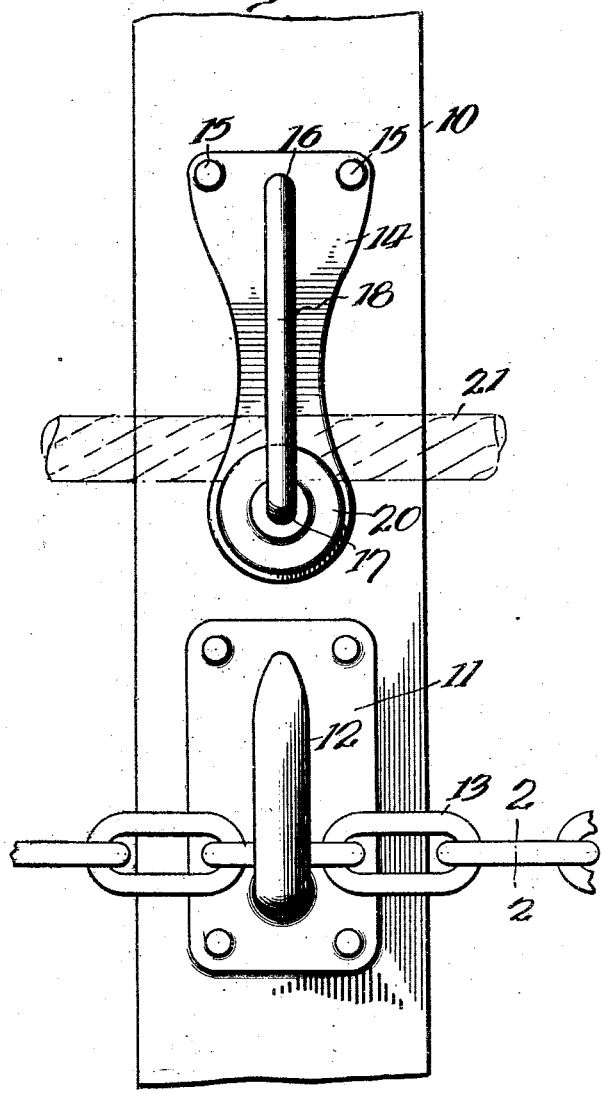
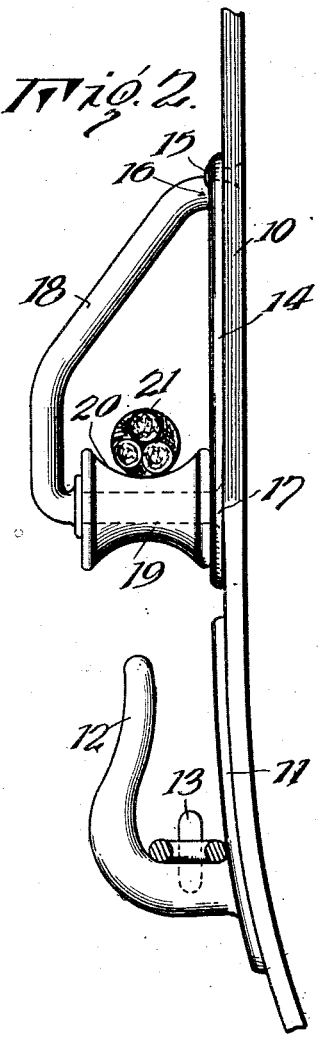
Inventor
P. G. Giddens

UNITED STATES PATENT OFFICE.

PERRY G. GIDDENS, OF COLUMBUS, GEORGIA, ASSIGNOR TO CURTIS M. BASS, OF COLUMBUS, GEORGIA.

DRIVING-REIN SUPPORT.

1,309,195.  Specification of Letters Patent.  Patented July 8, 1919.

Application filed October 26, 1916, Serial No. 127,920. Renewed January 8, 1918. Serial No. 270,212.

*To all whom it may concern:*

Be it known that I, PERRY G. GIDDENS, a citizen of the United States, residing at Columbus, in the county of Muscogee and State of Georgia, have invented certain new and useful Improvements in Driving-Rein Supports, of which the following is a specification.

This invention relates to attachments to harness, more particularly to the class of heavy draft harness used in plowing operations, and has for its principal object to provide an attachment for guiding the plow line or reins.

With these and other objects in view, the invention consists in certain novel features of construction, as hereinafter shown and described and then specifically pointed out in the claim; and in the drawings illustrative of the preferred embodiment of the invention—

Figure 1 is a side elevation of a portion of the back band of a harness including the trace carrier with the improvement applied.

Fig. 2 is an edge view of the portion of the back band shown in Fig. 1 with a side elevation of the attachment, the trace member being a section on the line 2—2 of Fig. 1.

Corresponding and like parts are referred to in the following description and indicated in all the views of the drawings by the same reference characters.

The improved device may be applied without structural change to any of the various forms of harness, but is more particularly applicable to draft harness which includes a back band, a portion of which is represented at 10. A trace holder is shown attached to the band 10 and includes a base member 11 and an open hook 12 in which the trace is slidably disposed, the latter being shown in chain form, as illustrated at 13. The improved device is located upon the back band 10 above the trace holder and comprises a base member 14 riveted or otherwise attached at 15 to the back band at its upper portion only, leaving the lower portion unattached.

The member 14 is perforated near its upper and lower ends to receive the terminals 16—17 of an arm or bracket device represented as a whole at 18. The lower portion of the bracket is directed horizontally, as shown at 19, to form a bearing to receive a roller 20, the roller being reduced intermediate the ends as shown in Fig. 2. The terminals 16—17 may be secured in any suitable manner in the base member 14, but are preferably riveted therein, as indicated in Fig. 2. The bracket member 18 thus performs the twofold function of a support for the roller and likewise as a guard to the plow line or rein which leads through the bracket and in contact with the roller. Ordinarily the plow lines or reins are of rope or like material, one of the plow lines being indicated at 21, and operate over the rollers 20, which thus guide the lines and prevent them from coming in contact with the adjacent portions of the harness or the body of the animal and likewise prevent abrasion of the lines.

By attaching the member 14 to the harness at the upper end only, or with the lower end unattached, the device may be applied to relatively small portions of the harness, or to curved portions of the harness, and maintain the bearing portion of the bracket in a horizontal position.

Of course it will be understood that one of the devices will be applied to the harness at each side.

With some forms of harness, the device will be attached to other parts than the back band, as for instance to the hip straps or to the hames.

Having thus described the invention, what is claimed as new is—

A device of the class described comprising a flexible support, a base member having its rear face flat and resting against the adjacent side of the support and its upper end enlarged and pierced at its corners by fastening devices engaging the support, the lower end of the base member being free, and a bracket device including a rod having its upper end rigidly secured to the base member between the spaced fastening devices and thence extended downwardly in spaced relation to the base to form a guard and thence extended inwardly and rigidly secured to the base at the free end thereof to form a horizontal bearing portion, and a driving rein guiding roller mounted for rotation on the horizontal bearing.

In testimony whereof I affix my signature.

PERRY G. GIDDENS. [L. S.]

Copies of this patent may be obtained for five cents each, by addressing the "Commissioner of Patents, Washington, D. C."